(12) United States Patent
Karlander

(10) Patent No.: US 6,522,669 B1
(45) Date of Patent: Feb. 18, 2003

(54) DEVICES AND METHODS RELATING TO TELECOMMUNICATIONS EQUIPMENT

(75) Inventor: Bo Karlander, Sollentuna (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 09/194,077

(22) PCT Filed: May 22, 1997

(86) PCT No.: PCT/SE97/00844
§ 371 (c)(1),
(2), (4) Date: Mar. 8, 1999

(87) PCT Pub. No.: WO97/44939
PCT Pub. Date: Nov. 27, 1997

(30) Foreign Application Priority Data

May 22, 1996 (SE) ............................................. 9601946

(51) Int. Cl.$^7$ ............................................. H04L 12/56
(52) U.S. Cl. ..................... 370/498; 370/395.6; 370/466; 370/474
(58) Field of Search ................................. 370/411, 412, 370/498, 474, 395.6, 395.7, 419, 395.1, 465, 466, 470, 472, 476, 432, 468

(56) References Cited

U.S. PATENT DOCUMENTS

| | | |
|---|---|---|
| 5,237,564 A | 8/1993 | Lespagnol et al. |
| 5,327,421 A * | 7/1994 | Hiller et al. ................. 370/466 |
| 5,412,655 A | 5/1995 | Yamada |
| 5,450,411 A | 9/1995 | Heil |
| 5,623,491 A * | 4/1997 | Skoog ........................ 370/466 |

FOREIGN PATENT DOCUMENTS

| | | |
|---|---|---|
| EP | 528085 | 2/1993 |
| WO | WO9411975 | 5/1994 |
| WO | WO9517789 | 6/1995 |

* cited by examiner

Primary Examiner—Suwa S. Rao
Assistant Examiner—Frank Duong

(57) ABSTRACT

The present invention relates to a telecommunications system, nodes, device boards and methods in such telecommunications systems, where a node comprises a first device board, which includes a receiving section (25) having at least one input port (29, 31, 33), to which an input buffer (30, 32, 34, 36, 38, 40) is connected for receiving TDM-channels in TDM-frames, and having at least one transmitting buffer (42, 44, 45). A second device board includes a transmitting section (27) having a receiving buffer (48, 50, 51) for every other device board, at least one output port (59, 61, 63) and at least one output buffer (52, 54, 56, 58, 60, 62) for every output port. All TDM-channels received in input buffers intended for the transmitting section are copied to a corresponding transmitting buffer and the content of the transmitting buffer reaches the transmitting section through sending of at least one transport module solely containing all TDM-channels intended for said second device board. The transport module is received in a corresponding receiving buffer in the transmitting section and all TDM-channels in all receiving buffers to be sent in a frame via an output port are copied to the output buffer corresponding to said port.

20 Claims, 5 Drawing Sheets

DEVICES AND METHODS RELATING TO TELECOMMUNICATIONS EQUIPMENT

FIELD OF INVENTION

The present invention relates to devices and methods pertaining to telecommunications equipment, and more particularly to methods for coupling TDM-channels through a node in a telecommunications system. The invention also relates to such nodes, and to a device board in such a node, and to a telecommunications system that includes such device boards and such nodes.

DESCRIPTION OF THE PRIOR ART

Several different ways of coupling TDM-channels through a node with the aid of different forms of transport modules, such as cells for instance, are known in the art.

U.S. Pat. No. 5,237,564 describes how frames are coupled through an ATM-switch, said frames being referred to as frame relay types and having variable lengths.

U.S. Pat. No. 5,412,655 describes a system which couples TDM-channels through an ATM-switch. In this system, there is received a frame which includes a plurality of time slots of which each may include a TDM-channel. Information transmitted in the channels is stored in a corresponding buffer, i.e. there is one buffer for each TDM-channel. When one such buffer is full, its contents are sent through the switch in an ATM-cell and one cell is thus used with each connection.

U.S. Pat. No. 5,450,411 describes a system for multiplexing isochronous data and burst data and sending the multiplexed data through an ATM-switch with the aid of an ATM-cell.

WO94/11975 and WO95/17789 describe ATM-networks. Among other things, these documents describe an ATM node or an ATM-switch which receives traffic in the form of PCM signals (Pulse Code Modulation) in channels having the form of time slots in mutually sequential frames, wherein PCM signals arriving at ATMU units (ATM Interface Unit) are packed in ATM-cells and coupled through an ATM-switch core to a corresponding ATMU unit, where the PCM signals are transmitted in time slots in mutually sequential frames. A node or switch contains several such ATMU units and all PCM channels that are to be transmitted between two such ATMU units are packed in the same cell. An ATMU unit receives the PCM signals on something that is referred to as NCT links, and includes a number of multiplexors coupled to a matrix-configured buffer CWB (Cell Wide Buffer) which is dimensioned in accordance with the number of bytes (i.e. the complete PCM word in a time slot) that can be included in an ATM-cell, and also in accordance with the number of other ATMU units present in the node. In this case, the number of multiplexors is equally as large as the number of bytes that can be accommodated in a cell. All multiplexors are also connected to an incoming NCT line. These multiplexors receive mutually synchronized frames with time slots over the NCT lines, and each multiplexor is able to switch a selected time slot from a selected line to a selected position in CWB. In this case, the multiplexors first switch the first time slot of all incoming frames to selected positions, and then switch the second time slot of all frames, and so on. Cells are then formed from the contents of the CWB. ATMU operates essentially in the same way in the opposite direction, although with the use of demultiplexors which couple out bytes with PCM signals on NCT lines synchronously with one another. In this case, the multiplexors and demultiplexors operate synchronously with one another and thus require all channels to be equally large for switching the channels. The size described is that of pulse-code modulated signals, which normally have a size of one byte. However, channels of different sizes on one and the same line are very usual in the concept of present-day telecommunications. For instance, it is usual to compress PCM signals and take up less than one byte, for instance. Such compression may be of interest when wishing to reduce the costs of using a public network. The aforedescribed system does not allow such smaller channels to be switched at the same time as switching the larger PCM channels, because of the use of multiplexors. The system described in this prior publication also requires the NCT lines, as experienced by the multiplexors, to be synchronized with one another.

SUMMARY OF THE INVENTION

The present invention addresses the problem of how TDM-channels of mutually different sizes can be coupled simultaneously through a node in a telecommunications system when all TDM-channels that are received in a frame on a device board in the node and that shall be sent to a second device board in the node are packed in a common transport module.

This problem is solved by storing in an input buffer the contents of a frame from an information stream received on a first device board, copying the contents of all TDM-channels that are stored in each such input buffer on the first device board and that are to be further coupled from the node via a transmitting section of a second device board, to a transmitting buffer corresponding to said transmitting section, and sending the content of the transmitting buffer to the second device board by means of a transport module.

The problem is also solved by receiving one such transport module that includes TDM-channels in a transmitting section of a second device board in the node, wherein the transport module solely includes a plurality of TDM-channels arriving from a first device board, wherein the content of the transport module is stored in a receiving buffer corresponding to the first device board, wherein all TDM-channels in each receiving buffer on the second device board that shall be sent in a frame on a node outgoing line are copied in an output buffer to positions corresponding to said channels, and wherein the content of the output buffer is sent in a frame in a node-outgoing information stream that includes mutually sequential frames.

Thus, an object of the present invention is to provide a method, a telecommunications system, a node, and a device board in which simultaneous coupling of TDM-channels of mutually different sizes through a node in a telecommunications system is achieved wherewith all TDM-channels that are received in a frame on a device board in the node and that shall be sent to a second device board in said node are packed in a common transport module which is sent to said second device board.

The object is achieved with a method that includes the steps of receiving in a receiving section of a first device board in the node at least one information stream that includes mutually sequential frames, where each frame includes a number of TDM-channels, storing the content of one frame from an information stream in a corresponding input buffer, copying the content of all TDM-channels that are stored in each such input buffer and that are to be forwarded from the node to a second device board via a transmitting section (27) to at least one transmitting buffer corresponding to said transmitting section, and transmitting the content of the transmitting buffer by means of at least one transport module.

The object is also achieved with a telecommunications system, a node in a telecommunications system, and a device board in such a node, wherein the device board includes a receiving section that has at least one input port for receiving. TDM-channels in TDM-frames, and at least one transmitting buffer which is adapted for connection between the receiving section and a transmitting section of another device board. Each input port has connected thereto at least one corresponding input buffer for receiving a frame that contains TDM-channels, wherein each input buffer is also connected to each transmitting buffer. The receiving section also includes control means. The control means is connected to all transmitting buffers and to all input buffers and is responsible for copying to said transmitting buffer all the TDM-channels that are received on the device board and stored in the input buffers and that are intended for the transmitting section of the other device board, and to ensure that the content of the transmitting buffer reaches the transmitting section of the other device board, by sending at least one transport module that contains solely all TDM-channels that are intended for the other device board.

The object is also achieved with a method comprising the steps of receiving at least one transport module including TDM-channels in a transmitting section of a second device board in the node, wherein the transport module contains solely a number of TDM-channels arriving from a first device board, storing the content of the transport module in a receiving buffer corresponding to the first device board; copying on the second device board all TDM-channels in each receiving buffer that shall be sent in a frame on a node-outgoing line to positions in an output buffer corresponding to said channels, and sending the content of the output buffer in a frame in a node-outgoing information stream that includes mutually sequential frames.

The object is also achieved with a telecommunications system, a node in a telecommunications system, and a device board in such a node, wherein the device board includes a transmitting section having at least one output port and at least one receiving buffer for storing all TDM-channels that have been received from at least one other device board through the medium of at least one transport module, wherein a transport module contains solely TDM-channels from another device board. Each output port has at least one output buffer connected thereto, wherein each output buffer is also connected to each receiving buffer. The transmitting section also includes control means connected to each output buffer and to each receiving buffer. The control means causes storage of the content of a transport module received from another device board in a corresponding receiving buffer, copying from each receiving buffer all TDM-channels that are to be sent in a frame from an output port to positions in a corresponding output buffer corresponding to said channels, so as to enable the TDM-channels to be sent from the transmitting section in a frame in a node-outgoing information stream that includes mutually sequential TDM-frames.

The invention also solves another problem of through-coupling TDM-channels where information streams containing line-carried TDM-channels arrive at and leave from a node without being synchronized with one another.

This other problem is solved by receiving a number of TDM-channels in a receiving section of a first device board in the node via at least two different input ports, and sending all TDM-channels that shall be forwarded from the node via a transmitting section of a second device board to said transmitting section by means of at least one transport module first when each input port has received its respective frame, said transport module containing solely all of the TDM-channels intended for said other device board.

The second problem is also solved by receiving in the transmitting section of a second device board transport modules that include TDM-channels, unpacking the TDM-channels from the transport modules, and then forwarding all TDM-channels that have been obtained in this way in at least one TDM-frame, wherein TDM-channels that have been received in the transmitting section are forwarded in frames via at least two output ports, and a frame is forwarded from a port only when all TDM-channels to be sent in said frame have been received in the transmitting section.

Thus, it is also an object of the invention to provide a method, a telecommunications system, a node and a device board for through-coupling TDM-channels when information streams including TDM-channels that arrive at and leave from said node on lines are not synchronized with one another.

This object is achieved with a method in which frames that include a number of TDM-channels are received in a receiving section of a first device board in the node via at least two different input ports; and in which all TDM-channels that are to be forwarded from the node via a transmitting section of a second device board are sent to said transmitting section by means of at least one transport module, said transport module containing solely all of the TDM-channels that are intended for the second device board. All transport modules are sent from the receiving section only when each input port has received its respective frame.

The object is also achieved with a telecommunications system, a node in a telecommunications system, and a device board in such a node, wherein the device board includes a receiving section which has at least two input ports for receiving TDM-channels in TDM-frames, at least one transmitting buffer which is adapted for connection between the receiving section and a transmitting section of another device board, and a control means which is connected to the transmitting buffer and adapted, on the one hand, to store therein all those TDM-channels received on the device board that are intended for the transmitting section of the other device board, and, on the other hand, to ensure that the content of the transmitting buffer reaches the transmitting section of the other device board, by sending at least one transport module which contains solely all TDM-channels intended for said other device board, wherein transmission of all transport modules from the receiving section takes place only when each input port has received its respective frame.

The object is also achieved with a method in which transport modules are received in the transmitting section (27) of a second device board, wherein the transport modules include TDM-channels that have been coupled through the node from a second device board, wherein the TDM-channels are unpacked from the transport modules, wherein all TDM-channels obtained in this way are then forwarded in TDM-frames via at least two output ports, and wherein a frame is forwarded from a port when all TDM-channels to be sent in this frame have been received in the transmitting section.

The object is also achieved with a telecommunications system, a node in a telecommunications system and a device board in such a node, wherein the device board includes a transmitting section having at least one output port, at least one receiving buffer for storing all TDM-channels that have been received from at least one other device board by means of at least one transport module, wherein a transport module contains solely TDM-channels from another device board, and control means adapted to cause storage of the content of a transport module received from another device board in a corresponding receiving buffer and transferring the TDM-channels in the receiving buffer to at least one of the output ports for transmission of the TDM-channels from the transmitting section in TDM-frames, wherein transmission of a frame takes place when all TDM-channels to be included in the frame have been received in the transmitting section.

The present invention provides a node that is flexible and able to through-connect TDM-channels of different sizes simultaneously.

The present invention provides a node that is able to through-connect TDM-channels with a low and short delay simultaneously together with other types of traffic. For instance, purely ATM-cells can be put through the same node.

The invention also provides an inexpensive node, insomuch that the node is able to through-connect traffic that arrives at and departs from the node in transport modules, while, at the same time, enabling traffic to be through-connected that arrives at and departs from the node in TDM-frames. This is particularly advantageous when a node that through-connects traffic by means of transport modules already exists and it is desired to also use this node for through-coupling TDM-frames.

The present invention provides a node that through-connects TDM-channels with a short and constant delay.

By transport module is meant such devices as cells in ATM-switches or frames in nodes of the frame relay type. By device board is meant a module that is intended for connection to a node in a telecommunications system, such as, for instance, a circuit board having input ports and output ports that are connected to a switch core in an exchange. The device board may, for instance, be a circuit board connected to another circuit board in a magazine, via a backplane bus.

The invention will now be described in more detail with reference to preferred embodiments thereof and also with reference to the accompanying drawings.

DETAILED DESCRIPTION OF PREFERRED EMBODIMENTS

Figure 1:
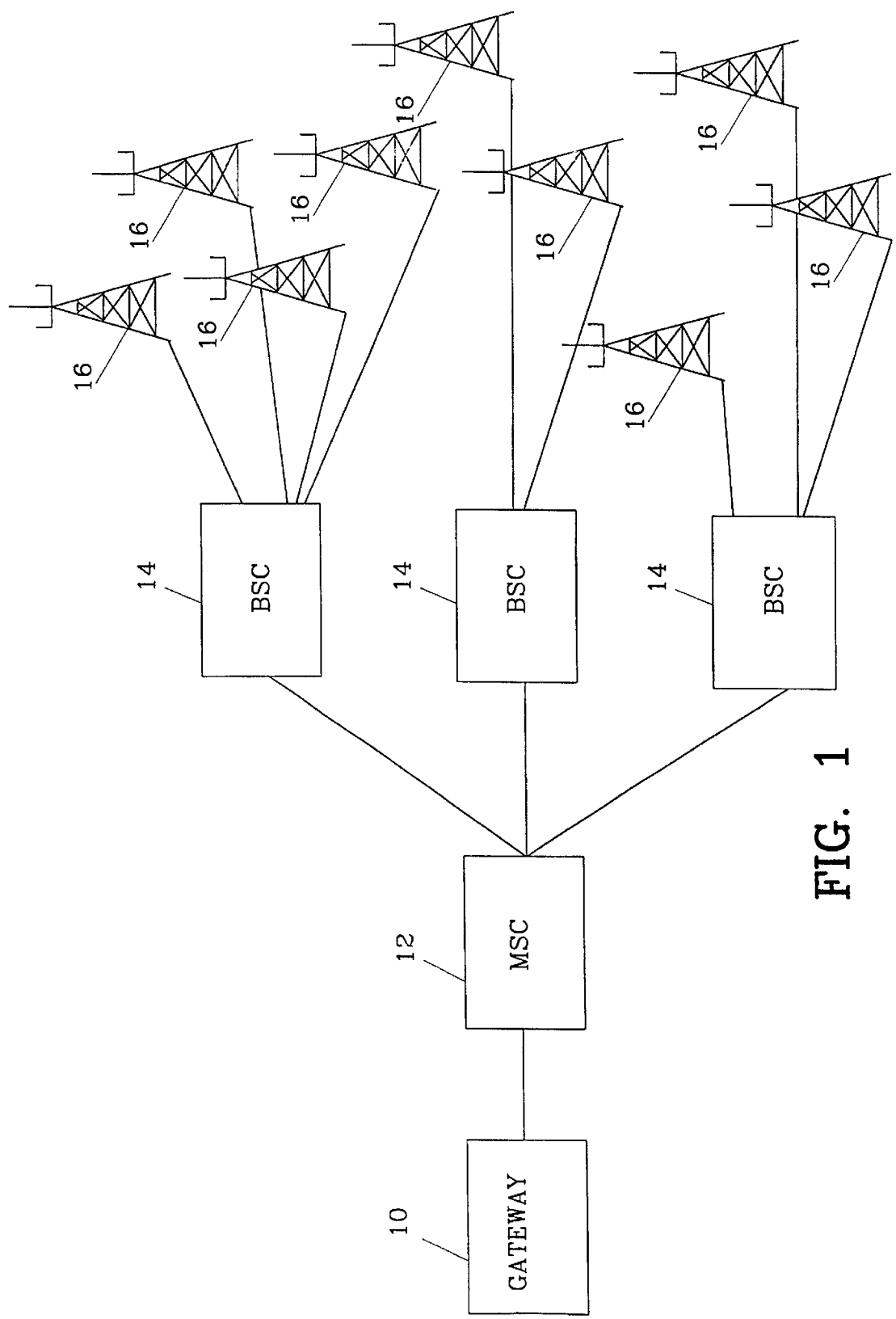
FIG. 1 illustrates schematically in block form a simplified telecommunications network in accordance with the invention.

FIG. 1 illustrates a preferred telecommunications system according to the invention. The illustrated system is a mobile telephony system, although it will be understood that the invention is not restricted to such systems and that it can be applied in any system for telephony, data, multimedia, etc., that uses TDM-frames. The preferred system includes a plurality of base stations 16 which are connected to base station controllers, BSC 14. The illustrated system includes three BSCs, where a first is connected to four base stations, a second is connected to two base stations and a third is connected to three base stations. The three BSCs are, in turn, connected to a mobile services switching centre, MSC 12, which in the illustrated embodiment includes a speech encoding unit. The BSCs could, advantageously, also include such a speech encoding unit. The MSC 12 is, in turn, connected to a port or gateway 10, which is the network port to said other network. This port is, in turn, connected to the public telephone network (not shown), so as to enable subscribers of the mobile telephony network to communicate with subscribers in said other network. The MSC 12 includes an ATM-switch according to the invention. Thus, an MSC will share the resources of an ATM-switch with other units. These other units may be parts of the public telephone network or some other network that normally uses ATM-techniques. The modus operandi of the mobile telephony network plays no part of the present invention and will be evident to the person skilled in this art. In fact, the invention is not limited to any particular part of a network or to the network described here.

Figure 2:
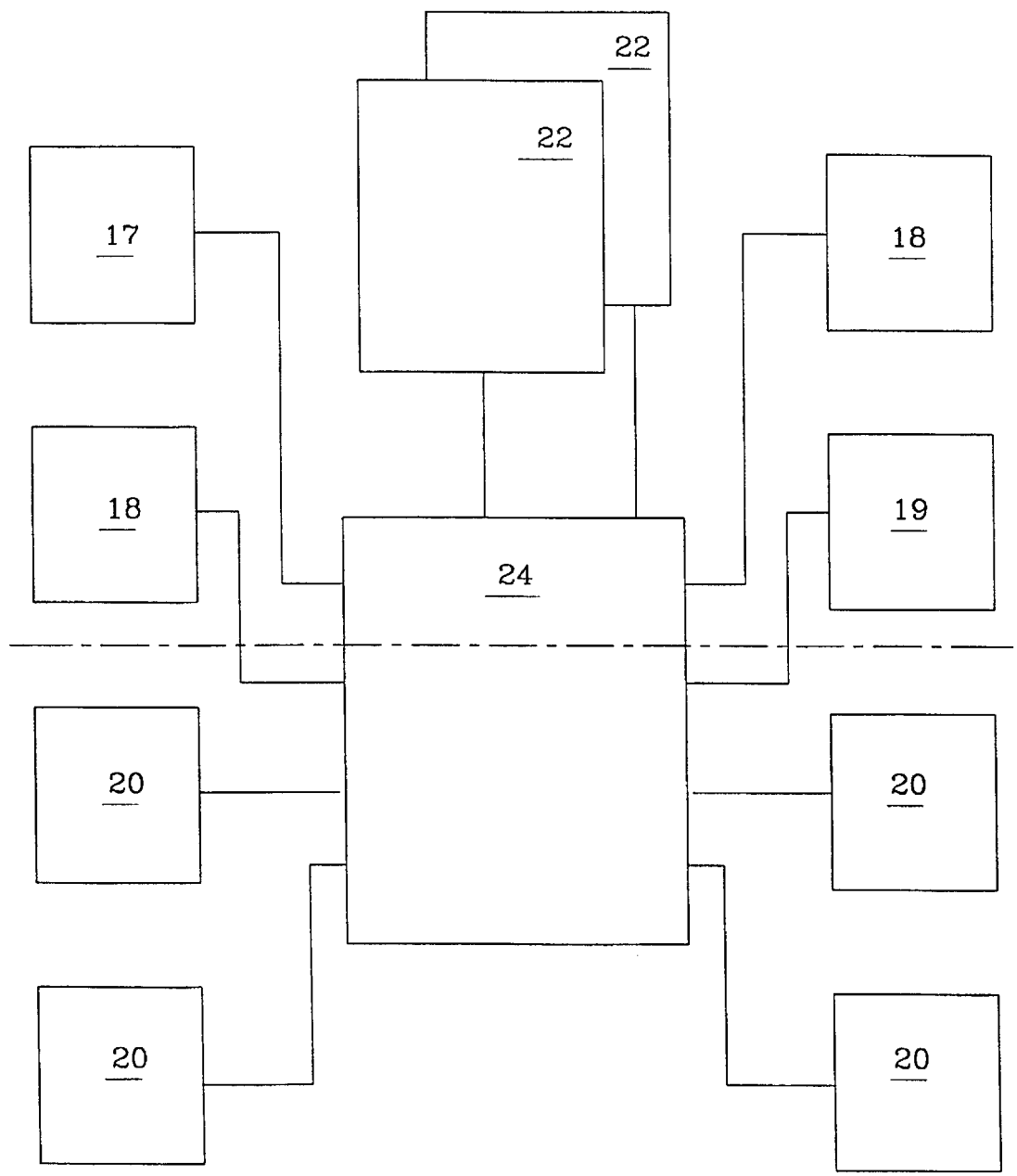
FIG. 2 is a block schematic illustrating an inventive node, wherein the node is shared by the telecommunications network in FIG. 1 and by another telecommunications network.

FIG. 2 illustrates a physical node that includes those parts of the MSC 12 in FIG. 1 that are essential to the invention. The Figure illustrates schematically an ATM-switch according to the invention. The switch includes an ATM switch core 24 which is connected to eight device boards 17, 18, 19 and 20. These device boards include a plurality of inputs and outputs for receiving and sending traffic (not shown). Two main control means in the form of two processors 22 are also connected to the switch core 24, where one processor is a redundant processor and is only actuated when the other processor fails to function satisfactorily. The active processor 22 controls the switch core 24 to through-couple ATM-cells from one board to another, in accordance with the address given in a header of each cell. This through-coupling is effected in a known manner, by setting-up a virtual path while using a virtual path identifier and a virtual channel identifier, these identifiers being present in the header of each cell. Four of the device boards 20 in the lower part of FIG. 2 are typical ATM device boards, i.e. a board that receives ATM-cells, said cells being coupled to other device boards of the same type through the switch core. This type of board is also known in the art. The TDM device boards 17, 18 and 19 are, however, different. Such a board receives TDM-frames containing TDM-channels and, in this preferred embodiment, transfers the content of these channels to another TDM device board. This transfer, however, takes place in the form of ATM-cells which are coupled through the switch core 24 in the normal manner. The content of the ATM-cells received on such a TDM device board 17, 18, 19 is then converted back to TDM-frames. In this preferred embodiment, the ATM-switch shown in FIG. 2 functions essentially as two separate switches. An ATM-switch that solely couples ATM-cells and a TDM-switch that couples TDM-channels, although in the form of ATM-cells. This is indicated in the Figure by a broken line that passes straight through the switch core 24 and separates the TDM device boards 17, 18 and 19 from the ATM device boards 20. Those parts of the ATM-switch that are included in the MSC are those that are located above the broken line and contain the TDM device boards 17, 18 and 19. The manner in which the node or the ATM-switch shown in FIG. 2 are interconnected shall be seen only as an example of the invention. The device boards need not be connected to the switch core by an individual line. The switch core, the processors and the device boards are mounted on different circuit boards and may equally as well be interconnected in some other way, for instance by a common backplane bus, which may be straight, bidirectional, circular, etc.

Although the switch shown in FIG. 2 is included in an MSC, none of the elements specific for such an arrangement have been shown, such as the speech encoder. These elements are earlier known to the art and will not therefore be described in detail. The number of device boards may, of course, be varied and it is not necessary to use an even number of boards of each sort.

Figure 3:
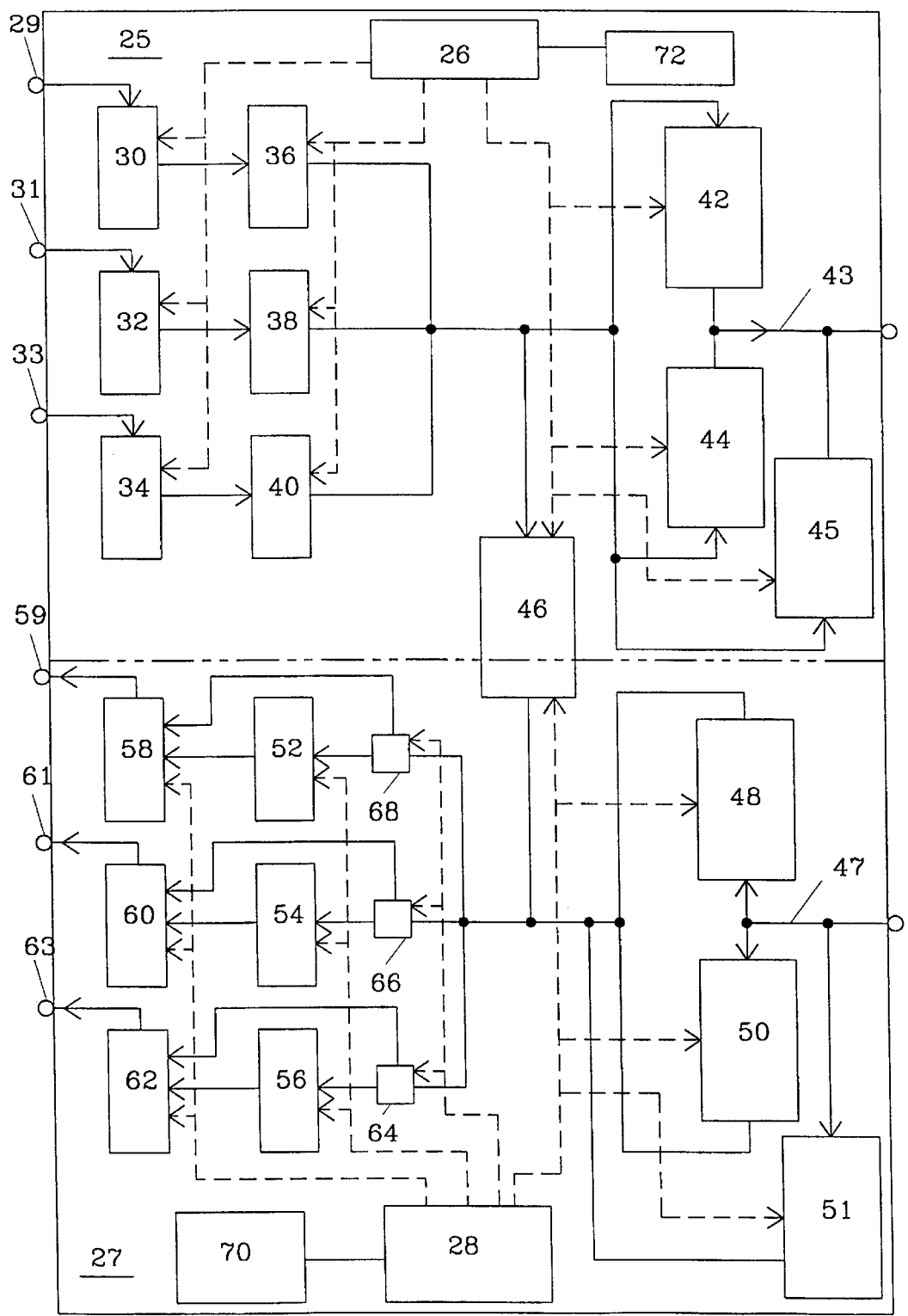
FIG. 3 is a block schematic illustrating a device board according to the invention.

FIG. 3 illustrates schematically a device board according to the invention that corresponds to a TDM device board 17, 18 or 19 in FIG. 2. The device board illustrated in FIG. 3 is simplified so as to enable the modus operandi of the invention to be explained more clearly.

The device board shown in FIG. 3 includes a local control means which, to facilitate an understanding of the invention, is divided into two halves. A first half 26 is included in and controls a receiving section 25 of the device board for converting incoming TDM-frames to outgoing ATM-cells, and a second half 28 is included in and controls a transmitting section 27 for converting ATM-cells to outgoing TDM-frames. The receiving section 25 includes a first, a second and a third input port 29, 31 and 33 respectively, at which incoming TDM-frames arrive and each of which is connected to a respective first input buffer 30, 32 and 34. Each of these first input buffers 30, 32 and 34 is connected to a respective second input buffer 36, 38 and 40 respectively. These buffers are all large enough to receive a full TDM-frame in each buffer. The second input buffers 36, 38 and 40 are connected, via a common line, to three transmitting buffers 42, 44 and 45 and to a transmitting/receiving buffer 46 which is shared by the transmitting and receiving sections 27 and 25. The transmitting buffers 42, 44 and 45 are arranged for each other device board to which the information in the TDM-frames received via the input ports 29, 31 and 33 shall be coupled. Only one transmitting buffer for each such other device board is shown here, for the sake of clarity. However, the number of transmitting buffers per board may vary, as will be explained in more detail below. The transmitting buffers 42, 44 and 45 and the transmitting/receiving buffer 46 are all equally as large as the load section on a transport module used in the node, i.e. an ATM-cell. All transmitting buffers 42, 44 and 45 are connected to a line 43 which connects the device board with the switch core in the ATM-switch. The first half 26 of the local control means is connected to a packing table 72 and controls the transfer of the content of received TDM-frames to the first input buffers 30, 32 and 34, to and from the second input buffers 36, 38 and 40, to and from the transmitting buffers 42, 44, 45 and to and from the transmitting/receiving buffer 46. This control is shown in the Figure by broken arrows drawn between the first part 26 of the local control means and the first input buffers 30, 32 and 34, the second input buffers 36, 38 and 40, the transmitting buffers 42, 44, 45 and the transmitting/receiving buffer.

In addition to the transmitting/receiving buffer 46, the transmitting section 27 also includes three receiving buffers 48, 50 and 51 which are connected to the above-mentioned switch core via a line 47. These three receiving buffers 48, 50, 51 and the transmitting/receiving buffer 46 are then connected by a common line to the inputs of three switching devices 64, 66 and 68, each of which has, in turn, a first output connected to a respective corresponding first output buffer 58, 60 and 62, and each has a second output connected to a respective corresponding second output buffer 52, 54 and 56. Each second output buffer 52, 54 and 56 is, in turn, connected to the respective corresponding first output buffers 58, 60 and 62. The first output buffers 58, 60 and 62 are connected respectively to a first, second and third output port 59, 61 and 63 for transmission of outgoing TDM-frames. The second half 28 of the local control means is connected to an unpacking table 70 and, similar to the first half 26, controls transmission of information to and from the receiving buffers 48, 50 and 51 and from the transmitting/receiving buffer 46, to and from the second output buffers 52, 54 and 56, and to and from the first output buffers 58, 60 and 62. Similar to the first half, this control is also shown in broken arrows drawn between the second half 28 of the local control means and all first output buffers 58, 60 and 62, all second output buffers 52, 54 and 56, all receiving buffers 48, 50 and 51, the transmitting/receiving buffer 46, and all switching devices 64, 66 and 68. The manner in which TDM-channels are coupled through the device board will be explained in more detail hereinafter, although it can be mentioned here that the transmitting/receiving buffer 46 is intended for through-coupling channels that arrive on one of the input ports 29, 31 and 33 and that are to be coupled to one of the output ports 59, 61 and 63 on the same device board. The buffers and the control means halves are shown as different, physically separated devices in the Figure. Such devices may be provided in the form of shift registers, for instance. It is preferred, however, to provide the buffers and the tables as different parts of one or more memories and remaining parts of the control means halves as one or two processors. This would obviate the need of the various lines between the different buffers. The switching devices 64, 66 and 68 are preferably, in a similar way, in the form of a program loop in a processor.

It is also important to note that the number of input ports and output ports may be more or fewer. Eight input ports and eight output ports is the number preferred.

The input and output buffers will preferably be large enough to accommodate about thirty-two octets of information, and the transmitting/receiving buffers are preferably forty-eight octets large, where forty-seven of these octets can be used for user information. This to be able to include the full load section of an ATM-cell.

The two lines 43 and 47 that connect the device board with the switch core need not be two separate lines, but may be one common line.

The person skilled in this art is well aware that TDM-channels are normally transmitted in the form of frames, where one frame normally includes thirty-two or twenty-four time slots, each consisting of an octet or eight bits. At least one, or at least a part of one, of these time slots is used for signalling and contains the information required for connecting-up the channel. Such information is obtained in a frame before a channel is set-up in subsequent frames. Thus, signalling information for all TDM-channels that are to be set-up through the ATM-switch is obtained beforehand and the local control means sets up a packing table 72. Each item or row in this table corresponds to a certain TDM-channel. Thus, for each TDM-channel, the packing table 72 is filled with information relating to the port on which the TDM-channel arrives and the number of bits in the incoming frame it occupies. Assuming with a starting point from the ATM-switch in FIG. 2 and the network in FIG. 1 that a first subscriber connected to a base station 16 via a first BSC 14 shall be connected to a second subscriber connected to a second BSC 14 and a second base station, and that the first BSC is connected to a first TDM device board 17 and the second BSC is connected to a second TDM device board 19, the first TDM device board 17 will thus receive signalling information in a time slot in a TDM-frame and the local control means in this device board will then decide which transmitting buffer and which parts of said transmitting buffer shall be reserved for the TDM-channel that is to be set-up and thereafter informs the second device board 19 as to which transmitting buffer and which position in the transmitting buffer shall be used.

The local control means on the second device board 19 then carries out signalling with the MSC to which the second subscriber is connected and, in accordance with said signalling, fills its unpacking table 70 with information that indicates in which receiving buffer and in which parts of the receiving buffer the traffic information is contained, the output port to which this information shall be sent and to which part of a frame that is to be sent from the output port this information shall be transferred.

It would not be necessary to transfer information relating to which transmitting buffer shall be used, when only one transmitting and one receiving buffer is intended for traffic between two specific device boards. However, traffic intensity between two device boards can vary, and consequently more than one pair of transmitting and receiving buffers may be allocated for traffic between two device boards. This can be readily achieved, since the buffers in the preferred embodiment are in the form of memory storage locations and can therefore be easily redistributed. The memory in a device board may have additional storage space for providing these additional transmitting and receiving buffers. It is also possible to redistribute buffers from traffic connections between boards on which traffic intensity is low to boards on which traffic intensity is high.

The TDM-channel is ready to be taken into use when both tables have been filled with channel information.

The channels that are set-up may be one-way or two-way channels. The above-described relates solely to the one-way case. A two-way channel can be set-up in essentially the same way, although in the opposite direction.

There is one exception to the aforedescribed case of filling-in the tables, which is when the TDM-connection shall pass over the same device board, i.e. when the TDM-channel shall be coupled between two BSCs that are are both connected to the ATM-switch via the same device board. In this case, the transmitting/receiving buffer is used and the switch core in the ATM-switch is not used at all. Naturally, the transmitting/receiving buffer may also be expanded with more buffers, if so required. There is, of course, no reason to send information to any other device board, and the local control means sets up the table immediately in accordance with the signalling carried out.

In an alternative embodiment, this transmitting/receiving buffer is replaced with a conventional transmitting buffer and a conventional receiving buffer, and TDM-channels intended for output ports on the same device board are also coupled through the switch core.

Signalling is normally carried out under the control of one of said main control means.

Figure 4:
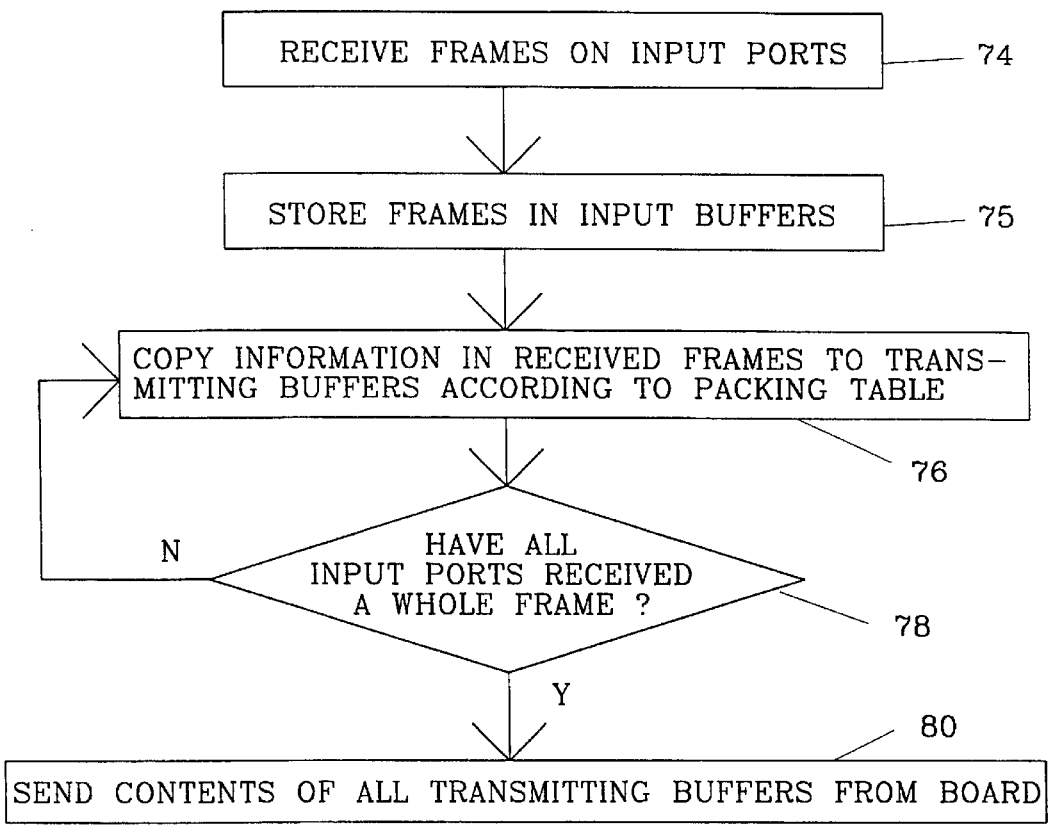
FIG. 4 is a flow chart illustrating a method of receiving and transmitting received TDM-channels from a receiving section of a device board to an ATM-switch core.
Figure 6:
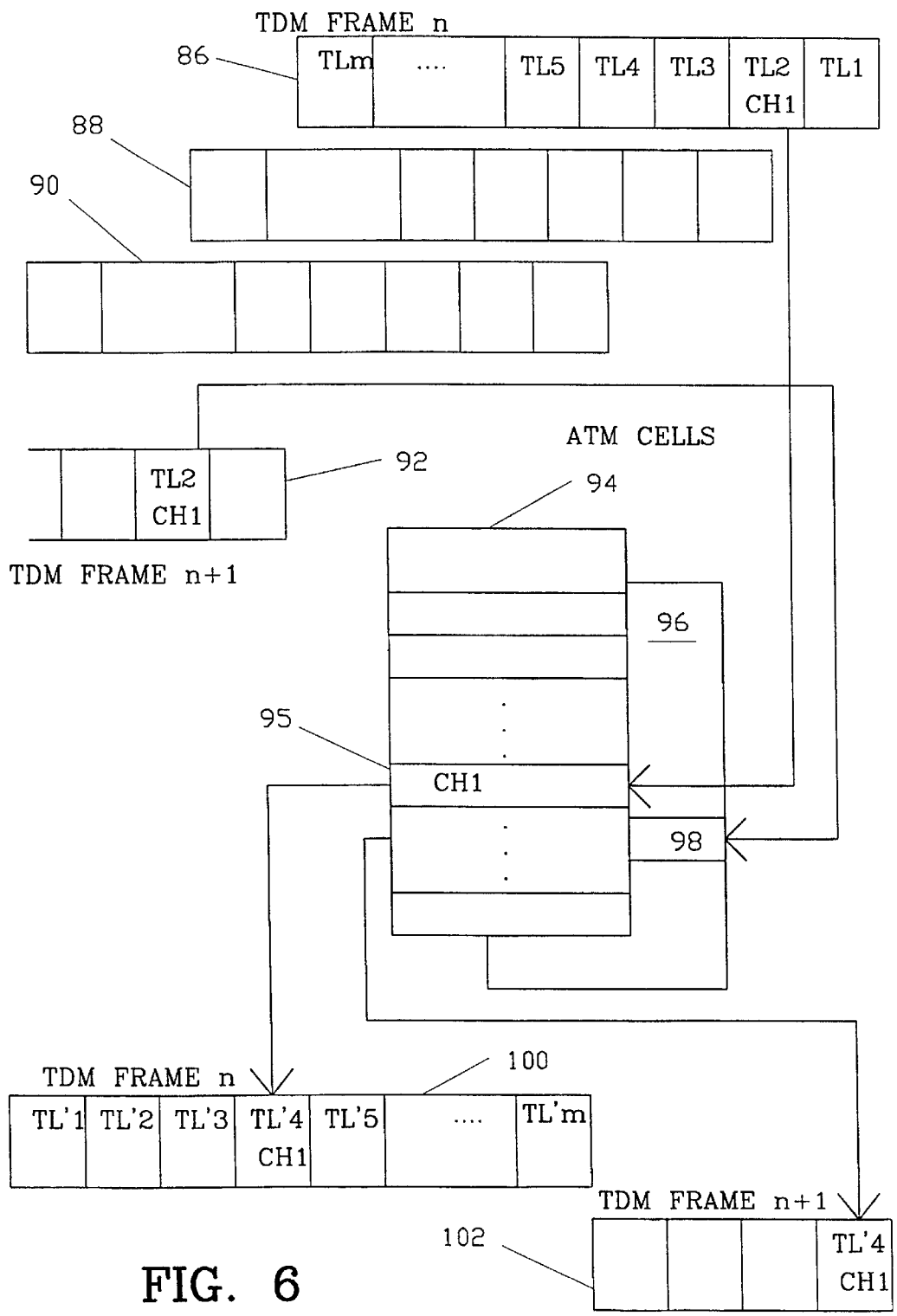
FIG. 6 illustrates in block form TDM-channels received in a node, transmitted ATM-cells, and TDM-frames transmitted from the node.

The manner in which TDM-channels are coupled from a device board to the switch core will now be described with reference to FIGS. 3, 4 and 6. Information streams are now received on the different input boards 29, 31 and 33. Each information stream includes mutually sequential frames. The frames in the various information streams are received asynchronously, i.e. are mutually opposite in time so that a frame received on one input will not be received at the same time as another frame on another input. This is illustrated in FIG. 6, which shows a first, second and a third frame 86, 88, 90 having frame number n that are mutually offset laterally in correspondence with a time shift. These frames are received on the first, second and third input ports 29, 31 and 33, 74 respectively. The first frame 86 includes m number of time slots designated TL1, TL2, TL3, TL4, TL5, . . . , Tlm, and all received frames have generally this structure.

The first half 26 of the local control means ensures that the information received in the first, second and third frame 86, 88, 90 is stored in respective first input buffers 30, 32 and 34, 75. When a complete frame has been received on the first input port 29 and its first input buffer 30 has been filled, all information in the buffer 30 is transferred to the second input buffer 36 of said port. This enables the first input buffer 30 to then receive immediately a new frame, a fourth frame 92, having frame number n+1 and containing generally the same channels as frame 86, without losing the content of the first frame 86 having frame number n.

The information contained by the second input buffers 36, 38 and 40 is then copied to the transmitting buffers 42, 44 and 45 and to the transmitting/receiving buffer 46, in accordance with the packing table 72, 76. Assume now that the packing table 72 indicates that a certain channel CH1 arriving in time slot TL2 in the first frame 86 shall be coupled to a first transmitting buffer 42 for transmission to a second device board. This time slot is then copied to a certain position in the first transmitting buffer 42 that corresponds to a position 95 in a first ATM-cell 94 to be transmitted. When all input ports have received their respective frames, i.e. the frames 86, 88 and 90, and all first input ports have copied the content of their respective first input buffers 30, 32 and 34 to corresponding second input buffers 36, 38 and 40 and the content of the second input buffers has been copied to indicated transmitting buffers 42, 44, 45 and to the transmitting/receiving buffer 46, 78, the local control means causes the contents of all transmitting buffers to be packed in transport modules that are sent from the device board via the line 43, 80. This is effected by appending a header to the content of each transmitting buffer, so as to form a transport module in the form of an ATM-cell. The header typically includes the address of the receiving device board, which in this embodiment of the invention is of the same type. Thus, the TDM-channel CH1 copied in the first transmitting buffer 42 is sent to the second device board in its position 95 by means of a first ATM-cell 94. The content of the transmitting/receiving buffer 46 is not sent in this way, but can, on the other hand, be copied to the output buffers on the same device board, and this content cannot be copied before the content of the transmitting buffers is sent from the device board. Subsequent to having sent the content of the transmitting buffers, the same procedure is followed with the content-of the following frames that are received on the input ports and that have frame numbers n+1. When the first cell 94 and all other corresponding cells from the second transmitting buffers 44 and 45 have been sent, the first transmitting buffer 42 is filled with the contents of the second input buffers 36, 38 and 40, in the illustrated case the TDM-channels that arrive from frames having frame numbers n+1.

Figure 5:
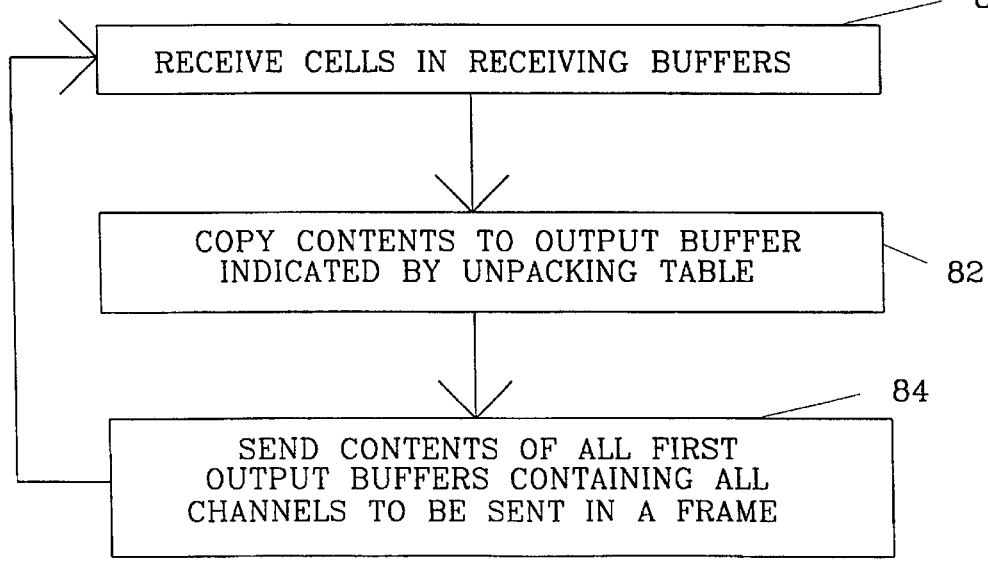
FIG. 5 is a flow chart illustrating a method for receiving ATM-cells from an ATM-switch core and transmitting from the transmitting section of a device board cells that include TDM-channels.

The manner in which TDM-channels in received transport modules are transferred to output ports for forwarding to other nodes in TDM-frames will now be described with reference to FIGS. 3, 5 and 6, where FIG. 3 illustrates the device board that now corresponds to the second device board that shall receive the TDM-channel CH1.

The second device board receives ATM-cells via the line 47. The cells are unpacked and their contents transferred to the receiving buffers 48, 50 and 51 in accordance with the information in the header of each cell and have access to the TDM-channel in the transmitting/receiving buffer 46, 81. The content of these buffers is then copied to the output buffers 52, 54, 56, 58, 60 and 62, 82. The second half 28 of the local control means causes information in a received cell to be copied in the following manner. The information in the receiving buffer determined by the unpacking table 70 is collected for each TDM-channel from the buffer positions indicated in the table. This information is then either copied to the first or the second output buffer that is connected to the output port indicated by the unpacking table 70. With reference to channel CH1 in FIG. 6, the content of the first cell 94 is received in a first receiving buffer 48 when the first receiving buffer 48 corresponds to the receiving buffer that is intended for cells from the transmitting first device board, under the assumption that the TDM-channel CH1 in the illustrated example shall leave this second device board from a first output port 59 in a fourth time slot TL'4 in a fifth frame 100 having frame number n and containing time slots TL'1, TL'2, TL'3, TL'4, TL'5, . . . , TL'm. The local control means then reads the unpacking table 70 to ascertain that the position to be occupied by this TDM-channel CH1 in the first output buffer 58 associated with said first output port 59 is not already occupied by earlier channel information for the same TDM-channel but belonging to an earlier frame that has frame number n−1 and that has still not yet been sent from the second device board. This is not the case in our example, and the local control means causes the lines and the switching device 68 belonging to the first output board 59 to connect the first output buffer 58 to the first receiving buffer 48 for storing the TDM-channel CH1 in a position in the first output buffer 58 that corresponds to transmission in the fourth time slot TL'4 in the fifth frame 100 having frame number n. When the first output buffer 58 has been filled with all TDM-channels that are to be sent, the content of a corresponding first buffer is transmitted in the fifth TDM-frame 100, 84. Assume now that all of the TDM-channels received in the first cell 94 have been copied to respective output buffers and that a second cell 96 has arrived at the first receiving buffer 48 containing, inter alia, information in the TDM-channel CH1 arriving from the fourth frame 92 and to be sent from the first output port 59 in a sixth frame 102 with frame number n+1. Also assume that the contents of the first output buffer 58 has still not been sent because not all of the TDM-channels that are to be sent in the fifth frame 100 have still not arrived, wherewith the content of the first receiving buffer 48 corresponding to the channel CH1 is stored in the second output buffer 52 belonging to the first output port 59. A corresponding procedure applies to all TDM-channels that are to be sent. Frames are sent from all output ports on the device board in this way. Selection of the first or the second output buffer is made by the local control means, which activates the switching devices 64, 66 or 68.

The present invention provides an arrangement and a method wherein the samples in a TDM-channel are through-connected with a constant delay. The various channels, however, can have different delays in relation to one another. The delay obtained when through-connecting a TDM-channel through the ATM-switch will depend on a number of different factors. The first factor is the time difference between the time at which a TDM-channel is received on an input port and the time at which all transport modules are sent from this device board. The other factor is the delay obtained due to actual through-coupling of the transport module from one device board to another, while a third factor is the time difference from the time at which the channel is copied in an output buffer to the time of actually sending the frame in which this channel is present. Because all TDM-channels from a device board that is intended for another device board use the same ATM-cell, and because the cells from each device board are sent when all input ports have received their respective frames, a constant and small delay is obtained for each TDM-channel, which when a TDM frame arrives every 125 μs results in a delay through the switch of about 250 μs.

In an alternative embodiment of the invention, two or more frames are received on each input before sending transport modules. In other words, a transmitting buffer is filled with the content of more than one frame per input port. This will, of course, require more input buffers per input port. Although this achieves a higher transport module packing density, it is achieved at the cost of a longer through-coupling time. In this way, the coupling time through the node is essentially equal to a multiple of the inverse of the rate at which TDM frames are received on an input port.

The above description is concerned with coupling TDM-channels through a node when the TDM-channel have mutually the same length. A channel is not limited to a time slot, but can contain any chosen number of bits in a frame and can thus contain a part of a time slot, a complete time slot or several time slots. Such different TDM-channel bandwidths are of interest, for instance, when compressed speech is to be transmitted. The present invention is, on the whole, highly suited for simultaneous coupling of TDM-channels of mutually different size. For instance, a number of channels may be comprised of non-compressed speech and others of compressed speech.

The local control means in a device board may also include other functions, such as monitoring for the loss of a transport module, which may be effected by sequence numbering of the transport modules, for instance.

The described device board can be modified in many ways. The device board of the described preferred embodiment includes a first and a second input buffer for each input port, for dealing with the case of non-synchronized frames. An alternative way of dealing with such frames is to have only one input buffer for each input, but a first and a second transmitting-buffer for each connection between two boards. The content of a received frame could then be copied to one of the first transmitting buffers on the one hand, while if the determined position of a TDM-channel in this buffer is already occupied, the TDM-channel is copied to the second transmitting buffer on the other hand. The content of all first transmitting buffers could then be transmitted when these first buffers are completely filled in accordance with the packing table, whereafter the content of the second transmitting buffers would be moved to the first transmitting buffers, or the first and the second transmitting buffers would then change (swap) identities, so that the first transmitting buffers became second transmitting buffers and vice versa.

As earlier described, the first and the second output buffers may, of course, be caused to change identities with one another in the same way, although in this case the device board illustrated in FIG. 3 must include connection of the second output buffers to respective output ports and possibly some form of switch means for switching between buffers that shall send a frame. Because a device board, according to the invention, preferably has the form of a processor and different storage spaces, this can be achieved very simply.

When all frames are sent and received to and from the node synchronously and the TDM-channels all have the same size, no input buffers are required. Each of the channels in the frames may then be transferred directly to a transmitting buffer and all transmitting buffers may transmit simultaneously. It would even be possible to exclude the output buffers from such a system. In this case, however, the TDM-channels that are received in the receiving buffers and that shall be included in a frame on an output, will be read-out sequentially in series and the signalling channel inserted in the frame at the correct point in time. This method would also require all other frames that are to leave the second output port to be read-out in the same way, parallel with the first described frame. This would also require a very accurate time control of the device board, so that one output buffer per output port will probably be preferred.

Neither is the invention restricted to conventional ATM-cells, but that so-called mini-cells may alternatively be used.

Neither is the invention restricted to use solely within a node. It may also be used between two different nodes. In the case involving ATM-nodes, a TDM device board 18 would send ATM-cells with TDM-channels to an ATM device board 20, see FIG. 2. These ATM device boards would then require some form of re-packing means for packing the ATM-cells in the received TDM-channels more densely for transmission to some other node in the ATM network. This other or second node would then receive the more densely packed cells with TDM-channels on an ATM device board and couple these cells (possibly after re-packing the cells to a lower density) to a TDM device board according to the invention.

Another conceivable system that utilizes the inventive principle is a frame-relay type system. Such a frame-relay type node would include several device boards that are interconnected via a common bus. The switch core, which in the earlier case is an ATM-type core, would in this case solely comprise the common bus, and the transport modules, which in the earlier case are ATM-cells of fixed length, would in this case be frames of variable frame size. Such a transport module would then include all TDM-channels from a device board that are intended for another device board.

It will be understood that the invention is not restricted to the aforedescribed and illustrated exemplifying embodiments thereof, and that modifications can be made within the scope of the following Claims.

What is claimed is:

1. A method of coupling TDM-channels through a node (12) in a telecommunications system, comprising the steps of receiving at least one information stream that includes mutually sequential frames (86, 88, 90, 92), (74) in a receiving section (25) of a first device board (17, 18, 19) in the node, wherein each frame includes a plurality of TDM-channels (TL1, TL2, TL3, TL4, TL5, . . . , Tlm); storing the contents of one frame from an information stream in a corresponding input buffer (75); copying the contents of all TDM-channels (CH1) stored in each such input buffer and to be forwarded from the node via a transmitting section (27) of a second device board to at least one transmitting buffer (42, 44, 45) (76) corresponding to said transmitting section, and sending the content of the transmitting buffer by means of at least one transport module (94, 96), (80), characterized in that the receiving section (25) receives TDM frames (86, 88, 90, 92) via at least two different input ports (29, 31, 33); and in that all transport modules (94, 96) are sent from the receiving section only when each input port has received its respective frame (78, 80).

2. A method according to claim 1, characterized in that all TDM-channels to be forwarded from the node via a transmitting section (27) of the first device board are stored in a transmitting/receiving buffer (46) and are released for read-out from the transmitting section only when each input port has received its respective frame (78, 80).

3. A method according to claim 1, characterized by copying the TDM-channels (TL1, TL2, TL3, TL4, TL5, . . . , Tlm) received in frames (86, 88, 90, 92) on the first device board (17, 18, 19) to said transmitting buffer (42, 44, 45) in accordance with a pre-established packing table (72), (76).

4. A method according to claim 1, characterized in that the transport modules are received in the transmitting section (27) of the second device board (81); in that the modules are unpacked; in that each TDM-channel to be sent in a frame of a node-outgoing information stream is stored in an output buffer corresponding to the frame, in a buffer position which corresponds to the position of the TDM-channel in the frame (82); and in that each such frame thus obtained is then forwarded from the node (840).

5. A method according to claim 4, characterized in that the contents of the received transport modules are unpacked and stored in at least one receiving buffer (48, 50, 51), wherein at least one receiving buffer is arranged for each other transport-module transmitting device board.

6. A method according to claim 4, characterized in that the TDM-channels that are received in the transmitting section are forwarded in frames (100, 102) via at least one output port (59, 61 63); and in that a frame is forwarded from a port when all TDM-channels that are to be sent in this frame have been received in the transmitting section.

7. A method according to claim 4, characterized in that the TDM-channels are unpacked from the transport modules in a specific order and forwarded in frames in accordance with a pre-established unpacking table (70).

8. A method according to claim 1, characterized in that the transport modules (94, 96) are coupled through the node at a through-coupling time which is substantially equal to the inverse of the rate, or a multiple of the inverse of the rate at which frames (86, 88, 90, 92) are received on a device board via a line.

9. A method of coupling TDM-channels through a node (12) in a telecommunications system, comprising the steps of receiving at least one information stream that includes mutually sequential frames (86, 88, 90, 92), (74) in a receiving section (25) of a first device board (17, 18, 19) in the node, wherein each frame includes a plurality of TDM-channels (TL1, TL2, TL3, TL4, TL5, . . . , Tlm); storing the contents of one frame from an information stream in a corresponding input buffer (75); copying the contents of all TDM-channels (CH1) stored in each such input buffer and to be forwarded from the node via a transmitting section (27) of a second device board to at least one transmitting buffer (42, 44, 45) (76) corresponding to said transmitting section, and sending the content of the transmitting buffer by means of at least one transport module (94, 96), (80), characterized in that a TDM-channel accommodates a determined number of bits of a frame; and in that different TDM-channels can accommodate different numbers of bits of said frame.

10. A method of copying TDM-Channels through a node (12) in a telecommunications system comprising:

receiving frames (86, 88, 90, 92) that include a plurality of TDM-channels (TL1, TL2, TL3, TL4, TL5, . . . , Tlm) in a receiving section (25) of a first device board (17, 18, 19) in the node via at least two different input ports (29, 31, 33), (74); and sending all TDM-channels (CH1) to be forwarded from the node via a transmitting section (27) of a second device board to said transmitting section by means of at least one transport module (94, 96), wherein said transport module solely contains all of the TDM-channels (CH1), (80) intended for said second device board, characterized in that all transport modules (94, 96) are sent from the receiving section only when each input port has received its respective frame (78, 80).

11. A device board (17, 18, 19) for connection to a node (12) in a telecommunications system, wherein the device board includes a receiving section (25) that has at least one input port (29, 31, 33) for receiving at least one information stream comprising mutually sequential frames (86, 88, 90, 92), wherein each frame includes a plurality of TDM-channels (TL1, TL2, TL3, TL4, TL5, . . . , Tlm), wherein the device board includes at least one transmitting buffer (42, 44, 45) which is adapted for connection between the receiving section and a transmitting section of another device board; wherein the device board includes control means (26, 28) connected to the transmitting buffer and adapted, on the one hand, to cause all TDM-channels that are received on the device board and intended for the transmitting section of the other device board to be stored in said transmitting buffer, and, on the other hand, to ensure that the contents of the transmitting buffer reaches the transmitting section of the other device board, by sending at least one transport module (94, 96) which contains solely all TDM-channels intended for said other device board; wherein each input port (29, 31, 33) has at least one corresponding input buffer (30, 32, 34, 36, 38, 40) connected thereto for receiving a frame containing TDM-channels, each input buffer also being connected to each transmitting buffer (42, 44, 45) in the receiving section (25); and wherein the control means is also connected to each input buffer and is adapted to copy, in said transmitting buffer, those TDM-channels (CH1) that have been stored in an input buffer and that are intended for the second device board, characterized in that each of the TDM-channels accommodates a determined number of bits of a TDM frame; and in that different of the TDM-channels can accommodate different numbers of bits of said frame.

12. A device board according to claim 11, characterized by a packing table (72) which is connected to the control means and which includes pre-established information relating to how TDM-channels (TL1, TL2, TL3, TL4, TL5, . . . , Tlm) received in the receiving section (25) shall be stored in the transmitting buffer (42, 44, 45).

13. A device board according to claim 11, characterized by a transmitting section (27) that includes at least one output port (59, 61, 63), wherein each output port has at least one output buffer (52, 54, 56, 58, 60, 62) connected thereto, at least one receiving buffer (48, 50, 51), wherein each receiving buffer receives a transport module from a corresponding transport-module transmitting device board, wherein each output buffer is also connected to each receiving buffer and to the control means (26, 28), wherein the control means is also adapted to copy all TDM-channels in each receiving buffer that shall be sent in a frame from an output port to channel-corresponding positions in the corresponding output buffer and to control transmission of the content of the output buffer in a frame (100) in a node-outgoing information stream that includes mutually sequential frames.

14. A device board according to claim 13, characterized in that the control means is adapted to control transmission of a frame from an output buffer when said buffer contains all TDM-channels in the frame.

15. A device board according to claim 13, characterized by a transmitting/receiving buffer (46) which is common to the transmitting and receiving section (25, 27) of the device board; and in that the control means is connected to the transmitting/receiving buffer and adapted to control the storage of all TDM-channels received on the device board that are intended for the transmitting section of the device board in this transmitting/receiving buffer, and thereafter to control the transfer of said TDM-channels to predetermined output buffers.

16. A device board according to claim 13, characterized in that connected to the control means (26, 28) is an unpacking table (70) which includes pre-established information relating to how TDM channels obtained in the transmitting section (27) shall be transferred to the output ports (59, 61, 63) of the device board; and in that the control means is adapted to control the transfer of the TDM frames obtained in the transmitting section in accordance with said table.

17. A device board (17, 18, 19) for connection to a node (12) in a telecommunications system, wherein the device board includes a receiving section (25) that has at least two input ports (29, 31, 33) for receiving TDM-channels (TL1, TL2, TL3, TL4, TL5, . . . , Tlm) in TDM frames (86, 88, 90, 92), at least one transmitting buffer (42, 44, 45) which is adapted for connection between the receiving section and a transmitting section of another device board, and further includes control means (26, 28) connected to the transmitting buffer and adapted to cause, on the one hand, the storage in said transmitting buffer of all TDM-channels received on the device board that are intended for the transmitting section of the other device board and, on the other hand, to ensure that the content of the transmitting buffer reaches the transmitting section of the other device board, by sending at least one transport module (94, 96) which contains solely all TDM-channels intended for said other device board, characterized in that the control means is adapted to cause the transmission of all transport modules (94, 96) from the receiving section only when each input port has received its respective frame.

18. A coupling node for connection to a telecommunications system and including a switch core (24) and at least one main control means (22) connected to said core for controlling coupling through the core and at least one first and one second device board (17, 18, 19) connected to the switch core, wherein the first device board includes a receiving section (24) that has at least one input port (29, 31, 33) for receiving TDM-channels (TL1, TL2, TL3, TL4, TL5, . . . , Tlm) in TDM frames (86, 88, 90, 92), wherein the receiving section (25) includes at least one transmitting buffer (42, 44, 45) which is adapted for connection between the receiving section and a transmitting section (27) of the second device board, and a control means (26, 28) which is connected to the transmitting buffer and adapted to cause, on the one hand, storage in said transmitting buffer of all TDM-channels received on the device board that are intended for the transmitting section of the second device board, and, on the other hand, to ensure that the content of the transmitting buffer reaches the transmitting section of the second device board, by sending at least one transport module (94, 96) which contains solely all TDM frames that are intended for the second device board, characterized in that the control means is adapted to cause transmission of all transport modules (94, 96) from the receiving section only when each input port has received its respective frame.

19. A coupling node according to claim 18, characterized in that the transmitting section (27) of the second device board includes at least one output port (59, 61, 63) at least one receiving buffer (48, 50, 51) for storing all TDM-channels that are received from the first device board; and in that a control means connected to all output ports is adapted to cause transmission of TDM-channels received in the transmitting section to said output ports, said TDM-channels having been received from at least one transport module arriving at the transmitting section, and to cause transmission of a frame when all TDM-channels that shall be included in said frame have been received in the transmitting section.

20. A telecommunications system that includes at least one coupling node, wherein the node includes a switch core (24) and at least one main control means (22) connected to the switch core for controlling coupling through said core, and at least one first and one second device board (17, 18, 19) which are connected to the switch core, wherein the first device board includes a receiving section (25) that has at least one input port (29, 31, 33) for receiving TDM-channels (TL1, TL2, TL3, TL4, TL5, . . . , Tlm) in TDM frames (86, 88, 90, 92); in that the receiving section (25) includes at least one transmitting buffer (42, 44, 45) which is adapted for connection between the receiving section and a transmitting section (27) of the second device board, and a control means (26, 28) which is connected to the transmitting buffer and adapted, on the one hand, to cause the storage in said transmitting buffer of all TDM-channels received on the device board that are intended for the transmitting section of the second device board and, on the other hand, to ensure that the content of the transmitting buffer reaches the second device board, by sending at least one transport module (94, 96) that contains solely all TDM-channels intended for the second device board, characterized in that the control means is adapted to cause transmission of all transport modules (94, 96) from the receiving section only when each input port has received its respective frame.

* * * * *